(12) United States Patent
Sakamoto

(10) Patent No.: US 11,718,130 B2
(45) Date of Patent: Aug. 8, 2023

(54) PNEUMATIC TIRE

(71) Applicant: The Yokohama Rubber Co., LTD., Tokyo (JP)

(72) Inventor: Yousuke Sakamoto, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 333 days.

(21) Appl. No.: 16/964,583

(22) PCT Filed: Dec. 27, 2018

(86) PCT No.: PCT/JP2018/048197
§ 371 (c)(1),
(2) Date: Jul. 23, 2020

(87) PCT Pub. No.: WO2019/146370
PCT Pub. Date: Aug. 1, 2019

(65) Prior Publication Data
US 2020/0361246 A1    Nov. 19, 2020

(30) Foreign Application Priority Data

Jan. 23, 2018    (JP) .................................. 2018-008851

(51) Int. Cl.
*B60C 11/11*    (2006.01)
*B60C 11/12*    (2006.01)
(Continued)

(52) U.S. Cl.
CPC ........ *B60C 11/1236* (2013.01); *B60C 11/033* (2013.01); *B60C 11/11* (2013.01);
(Continued)

(58) Field of Classification Search
CPC ................... B60C 11/033; B60C 11/11; B60C 11/1236; B60C 11/1204; B60C 11/1281;
(Continued)

(56) References Cited

U.S. PATENT DOCUMENTS 3,584,670 A * 6/1971 Verdier ............... B60C 11/0311
152/902
D319,994 S * 9/1991 Manestar ..................... D12/900
(Continued)

FOREIGN PATENT DOCUMENTS

CN     106976362           7/2017
DE     10311430 A1 *       9/2004
(Continued)

OTHER PUBLICATIONS

Machine translation for Japan 2013-018309 (Year: 2022).*
(Continued)

*Primary Examiner* — Steven D Maki
(74) *Attorney, Agent, or Firm* — Thorpe North & Western

(57) ABSTRACT

Provided is a pneumatic tire. Center land portions between main grooves extending in a zigzag shape along a circumferential direction on both sides of an equator of a tread portion are defined into repeating units by first shallow grooves that extend along a lateral direction, have both ends communicating with portions other than bent portions of the main grooves, and are disposed at intervals in the circumferential direction. The repeating units are aggregates of four blocks defined by second shallow grooves extending from the main grooves in the lateral direction and converging toward one point on the equator, a third shallow groove extending from one of the first shallow grooves adjacent to the repeating unit to one of the second shallow grooves, and a fourth shallow groove extending from an other of the first shallow grooves adjacent to the repeating units to an other of the second shallow grooves.

14 Claims, 4 Drawing Sheets

(51) Int. Cl.
*B60C 11/13* (2006.01)
*B60C 11/03* (2006.01)

(52) U.S. Cl.
CPC ...... *B60C 11/1204* (2013.01); *B60C 11/1281* (2013.01); *B60C 11/1353* (2013.01); *B60C 2011/0346* (2013.01); *B60C 2011/0362* (2013.01); *B60C 2011/0383* (2013.01); *B60C 2011/1361* (2013.01); *B60C 2200/14* (2013.01)

(58) Field of Classification Search
CPC ..... B60C 2011/0362; B60C 2011/1361; B60C 2011/0346; B60C 2011/0383
See application file for complete search history.

(56) References Cited

U.S. PATENT DOCUMENTS

| | | | | |
|---|---|---|---|---|
| 5,456,301 | A | * 10/1995 | Wise | B60C 11/11 |
| | | | | 152/209.15 |
| 6,126,426 | A | * 10/2000 | Mundi | B29D 30/0606 |
| | | | | 425/46 |
| 2011/0232814 | A1 | * 9/2011 | Nakamizo | B60C 11/0306 |
| | | | | 152/209.18 |
| 2013/0139936 | A1 | 6/2013 | Ohara | |
| 2014/0290815 | A1 | 10/2014 | Tomida | |
| 2022/0118796 | A1 | * 4/2022 | Sakamoto | B60C 11/01 |

FOREIGN PATENT DOCUMENTS

| | | | |
|---|---|---|---|
| GB | 2021494 | A * | 12/1979 |
| JP | 03-132403 | A * | 6/1991 |
| JP | H04-085112 | | 3/1992 |
| JP | 2009-006877 | | 1/2009 |
| JP | 2010-125999 | | 6/2010 |
| JP | 2013-018309 | A * | 1/2013 |
| JP | 2013-119277 | | 6/2013 |
| JP | 2014-189100 | | 10/2014 |
| JP | 2014-213841 | | 11/2014 |
| JP | 2016-007861 | | 1/2016 |
| WO | WO 2009/128098 | | 10/2009 |
| WO | WO-2011/080565 | A1 * | 7/2011 |
| WO | WO 2014/178182 | | 11/2014 |

OTHER PUBLICATIONS

Machine translation for Japan 03-132403 (Year: 2022).*
Machine translation for German 10311430 (Year: 2022).*
International Search Report for International Application No. PCT/JP2018/048197 dated Apr. 2, 2019, 3 pages, Japan.

* cited by examiner

PNEUMATIC TIRE

TECHNICAL FIELD

The present technology relates to a pneumatic tire suitable as a tire for running on unpaved roads and more particularly relates to a pneumatic tire that improves noise performance and running performance on unpaved roads.

BACKGROUND ART

A pneumatic tire used for running on unpaved roads such as uneven ground, muddy ground, snowy roads, sandy ground, and rocky areas generally adopts a tread pattern that is based on lug grooves or blocks including a large number of edge components and that has a large groove area. For such a tire, running performance on unpaved roads is improved by biting into mud, snow, sand, stone, rock, or the like on a road surface (hereinafter, referred to collectively as "mud or the like") to achieve traction performance and preventing grooves from being clogged with mud or the like (for example, see Japan Unexamined Patent Publication Nos. 2016-007861 and 2013-119277).

When Japan Unexamined Patent Publication Nos. 2016-007861 and 2013-119277 are compared with each other, it can be said that a tire in Japan Unexamined Patent Publication Publication No. 2016-007861 has a relatively smaller groove area and is a tire type taking running performance on paved roads into account. In contrast, it can be said that a tire in Japan Unexamined Patent Publication No. 2013-119277 has a large groove area and large individual blocks and is a tire type specialized for running performance on unpaved roads. Thus, the former tends to have degraded running performance on unpaved roads as compared with the latter, and the latter tends to have degraded performance under normal travel conditions as compared with the former. In recent years, various requests for tire performance have been made, and a tire for running unpaved roads having performance at an intermediate level between those two tire types has also been demanded. Thus, measures for efficiently improving running performance on unpaved roads with a reasonable groove shape are demanded. Further, as described above, a tire for running on unpaved roads is basically based on blocks, and has a large groove area, and hence noise performance (for example, pattern noise) tends to be degraded. Thus, noise performance is also demanded to be maintained or improved satisfactorily.

SUMMARY

The present technology provides a pneumatic tire that improves noise performance and running performance on unpaved roads.

A pneumatic tire according to the present technology includes: a tread portion having an annular shape extending in a tire circumferential direction, a pair of sidewall portions disposed on both sides of the tread portion, and a pair of bead portions disposed inward of the pair of sidewall portions in a tire radial direction, wherein the tread portion includes: a pair of main grooves extending in a zigzag shape along the tire circumferential direction on both sides of a tire equator and a center land portion defined between the pair of main grooves on the tire equator, the center land portion is defined into a plurality of repeating units by a plurality of first shallow grooves that extend along a tire lateral direction, have both ends communicating with portions other than bent portions of the pair of main grooves, and are disposed at an interval in the tire circumferential direction, and the repeating unit is an aggregate formed of four blocks defined by a pair of second shallow grooves extending from the main grooves in the tire lateral direction and converging toward one point on the tire equator, a third shallow groove extending from one of the pair of first shallow grooves, which is adjacent to the repeating unit, to one of the pair of second shallow grooves, and a fourth shallow groove extending from the other of the pair of first shallow grooves, which is adjacent to the repeating unit, to the other of the pair of second shallow grooves.

In the present technology, as described above, the center land portion defined between the pair of main grooves extending in a zigzag shape is formed of the repeating units each being the aggregate formed of the four blocks, the first to fourth shallow grooves are connected as described above, and the second to fourth shallow grooves included in the repeating unit converge toward the tire equator. Thus, a high edge effect can be secured with the complicated shape of the first to fourth shallow grooves as a whole, and running performance on unpaved roads can be improved effectively. Further, due to the first to fourth shallow grooves that are connected as described above, the shape of each of the blocks included in the repeating unit (particularly, the blocks arranged in the tire circumferential direction) is not constant. Thus, generation of pattern noise can be suppressed. Further, the first to fourth shallow grooves are connected as described above, and hence a structure having a large number of branches as a whole is obtained. With this, air column resonance can be suppressed, and transfer of noise can be suppressed. Thus, noise performance can be improved.

In the present technology, at least one of the four blocks may include a notch portion opened to the first to fourth shallow grooves. With this, traction performance with respect to road surfaces can be added due to the notch portion. This is advantageous in improving running performance on unpaved roads. Further, the shallow groove is further branched due to the notch portion. Thus, this is advantageous in reducing air column resonance.

In the present technology, a sipe may be formed in each of the four blocks, and the sipe may include a straight portion and a bent portion, the straight portion extending toward a position at which the pair of second shallow grooves converge and communicating with any one of the second to fourth shallow grooves, the bent portion extending while being bent in the same direction with respect to the straight portion. With this, an edge effect exerted by the sipes can be added. This is advantageous in improving running performance on unpaved roads. Particularly, each of the sipes includes the straight portion and the bent portion described above. With this, an excellent edge effect can be further obtained, and also increase in a sound pressure level can be suppressed to improve noise performance.

In this case, a narrow groove may be formed in each of the four blocks, and each of the narrow groove may have one end communicating with the main groove and another end joined to an end of the sipe. With this, dirt discharge performance can be improved more as compared with a case of providing only the sipes. This is advantageous in improving running performance on unpaved roads.

In this case, a depth of the narrow groove may be smaller than a depth of the shallow groove. Further, a depth of the notch portion may be smaller than a depth of the shallow groove and may be larger than a depth of the narrow groove. The depths of the respective portions are set as described above, and hence an effect of improving running performance on unpaved roads and an effect of reducing noise can be achieved in a well-balanced manner.

In the present technology, a groove area ratio of the second to fourth shallow grooves with respect to an area of an entirety of the repeating unit may fall within a range of from 17% to 33%. With this, the ratio of the groove area of the shallow grooves with respect to the repeating unit can be optimized, and hence an effect of improving running performance on unpaved roads and an effect of reducing noise can be achieved in a well-balanced manner.

In the present technology, when a block is freely-selected from the four blocks included in the repeating unit, each of areas of road contact surfaces of the other blocks included in the repeating unit may fall within a range of from 70% to 130% of an area of a road contact surface of the block. With this, the area difference among the blocks included in the repeating unit can be suppressed. This is advantageous in improving noise performance.

In the present technology, a raised bottom portion may be formed on a groove bottom of the first to fourth shallow grooves, and a groove depth of the raised bottom portion may be 75% or more of a maximum groove depth of the shallow groove to which the raised bottom portion is provided. The raised bottom portions are provided as described above, and hence rigidity of the blocks included in the repeating unit can be improved. This is advantageous in improving traction performance. Further, a groove cross-sectional area is small at the position at which the raised bottom portion is provided. This is advantageous in improving noise performance. Meanwhile, the groove depth of the raised bottom portion is ensured appropriately. Thus, even when the groove volume is reduced due to the raised bottom portion, running performance on unpaved roads can be ensured satisfactorily.

In the present technology, a mode in which a protrusion portion protrudes from the groove bottom of the main groove and extends along the main groove may be provided to the groove bottom of the main groove. With this, an edge effect exerted by the protrusion portion can be obtained, and an effect of preventing stone-biting for the main groove can be expected. This is advantageous in improving running performance on unpaved roads.

In the present technology, "tire ground contact edges" are both end portions of a ground contact region in a tire axial direction, which is formed when the tire is mounted on a regular rim, inflated to a regular internal pressure, and placed vertically upon a flat surface with a regular load applied thereto. "Regular rim" is a rim defined by a standard for each tire according to a system of standards that includes standards on which tires are based and refers to a "standard rim" in the case of JATMA (The Japan Automobile Tyre Manufacturers Association, Inc.), refers to a "design rim" in the case of TRA (The Tire and Rim Association, Inc.), and refers to a "measuring rim" in the case of ETRTO (The European Tyre and Rim Technical Organisation). "Regular internal pressure" is air pressure defined by a standard for each tire according to a system of standards that includes standards on which tires are based and is referred to as "maximum air pressure" in the case of JATMA, the maximum value being listed in the table "TIRE ROAD LIMITS AT VARIOUS COLD INFLATION PRESSURES" in the case of TRA, and is "INFLATION PRESSURE" in the case of ETRTO. However, "regular internal pressure" is 180 kPa in a case where the tire is for a passenger vehicle. "Regular load" is a load defined by a standard for each tire according to a system of standards that includes standards on which tires are based and refers to "maximum load capacity" in the case of JATMA, refers to the maximum value in the table of "TIRE LOAD LIMITS AT VARIOUS COLD INFLATION PRESSURES" in the case of TRA, and refers to "LOAD CAPACITY" in the case of ETRTO. However, a load corresponding to 88% of the loads described above is used in a case where the tire is for a passenger vehicle.

BRIEF DESCRIPTION OF DRAWINGS

FIG. 4 is an explanatory diagram schematically illustrating a cross-sectional shape of main parts in FIG. 2.

DETAILED DESCRIPTION

Configurations of embodiments of the present technology is described in detail below with reference to the accompanying drawings.

Figure 1:
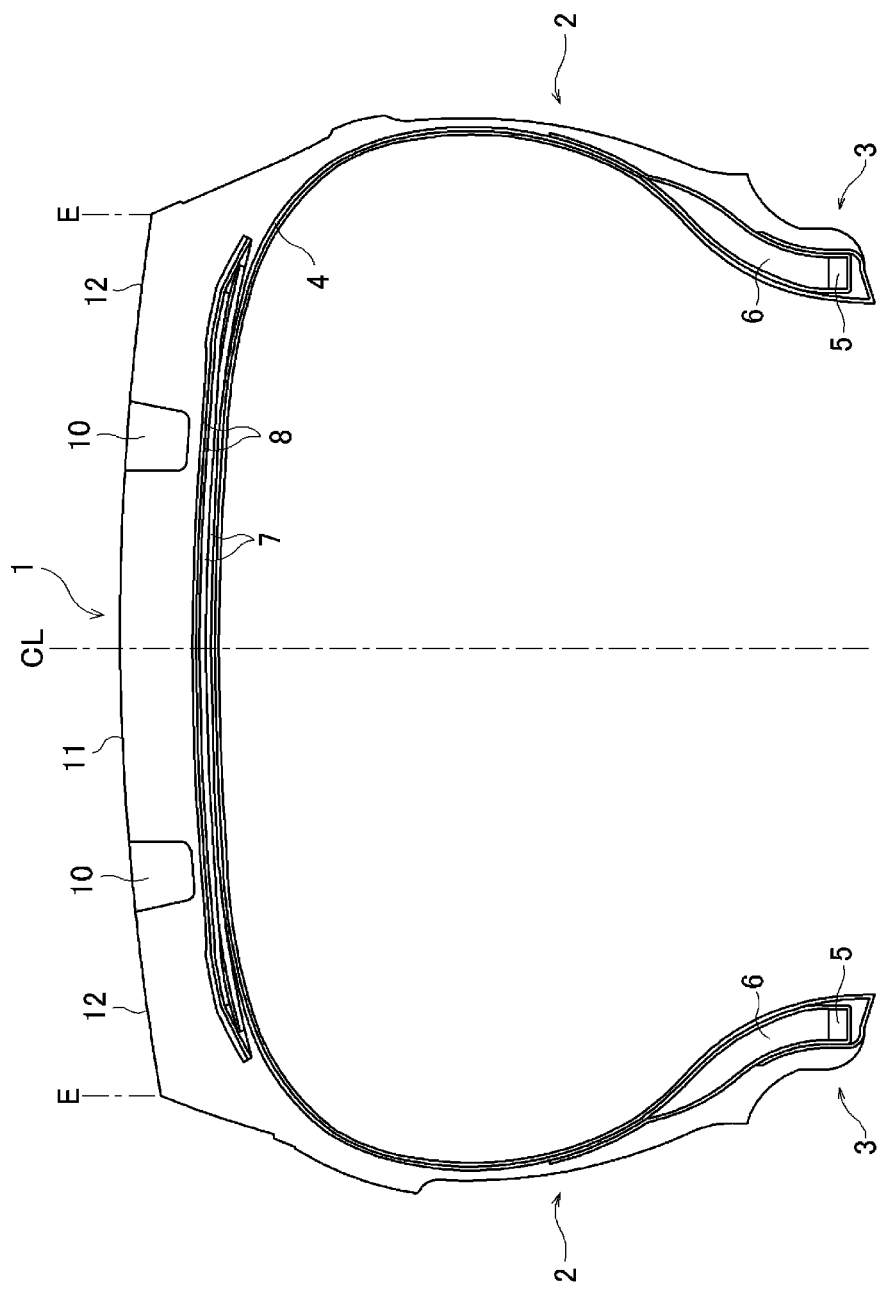
FIG. 1 is a meridian cross-sectional view of a pneumatic tire according to an embodiment of the present technology.

As illustrated in FIG. 1, the pneumatic tire according to the present technology includes a tread portion 1, a pair of sidewall portions 2 disposed on both sides of the tread portion 1, and a pair of bead portions 3 disposed inward of the sidewall portions 2 in a tire radial direction. In FIG. 1, reference sign "CL" denotes a tire equator, and reference sign "E" denotes a ground contact edge. Note that, although not illustrated because FIG. 1 is a meridian cross-sectional view, the tread portion 1, the sidewall portions 2, and the bead portions 3 each form an annular shape extending in a tire circumferential direction. With this, a toroidal basic structure of the pneumatic tire is formed. In the following, description referring to FIG. 1 is based on the meridian cross-sectional shape in the illustration. However, each tire component has an annular shape extending in the tire circumferential direction.

A carcass layer 4 is mounted between the left-right pair of bead portions 3. The carcass layer 4 includes a plurality of reinforcing cords extending in the tire radial direction and is folded back around a bead core 5 disposed in each of the bead portions 3 from a vehicle inner side to a vehicle outer side. Additionally, bead fillers 6 are disposed on the outer periphery of the bead cores 5, and each bead filler 6 is enveloped by a main body portion and a folded back portion of the carcass layer 4. On the other hand, in the tread portion 1, a plurality of belt layers 7 (two layers in FIG. 1) are embedded on an outer circumferential side of the carcass layer 4. The belt layers 7 each include a plurality of reinforcing cords that are inclined with respect to the tire circumferential direction, with the reinforcing cords of the different layers disposed in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

The present technology may be applied to such a pneumatic tire having a general cross-sectional structure. However, the basic structure is not limited to that described above.

Figure 2:
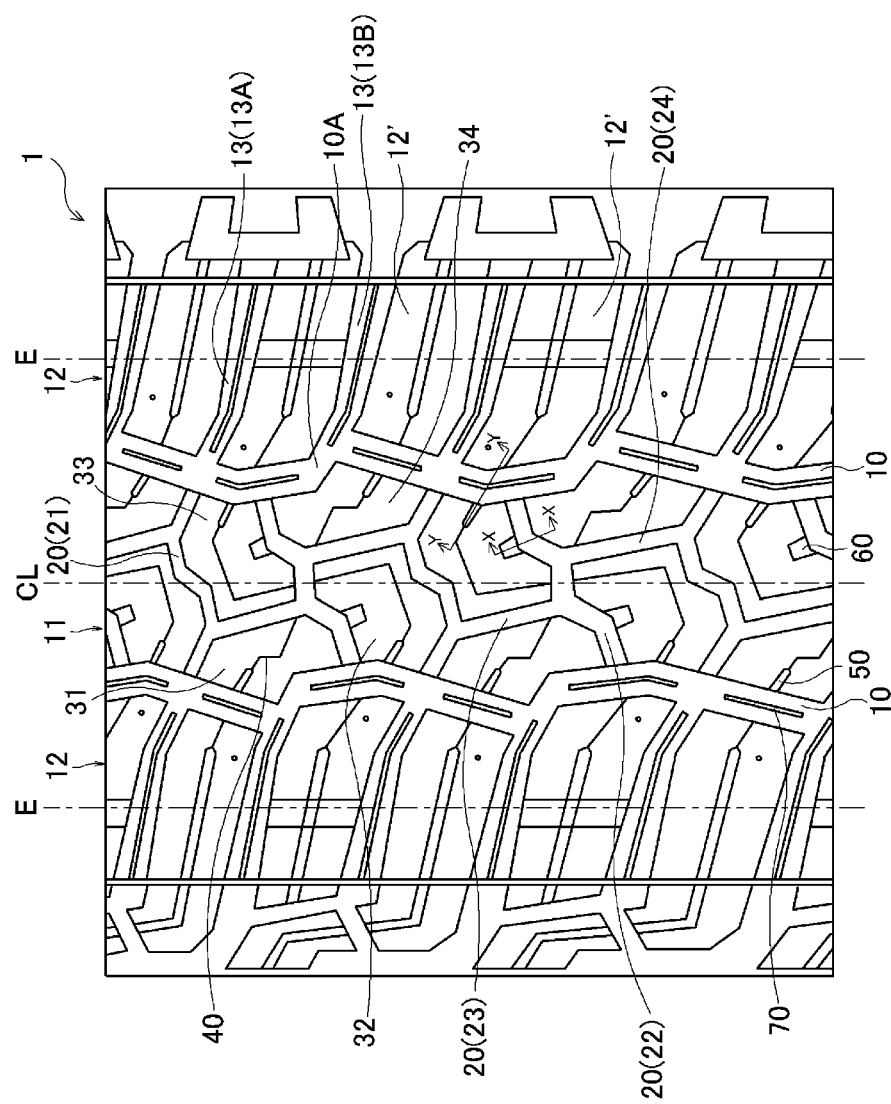
FIG. 2 is a front view illustrating a tread surface of a pneumatic tire according to an embodiment of the present technology.

As illustrated in FIG. 2, in the surface of the tread portion 1 of the pneumatic tire according to the present technology, a pair of main grooves 10 extending in a zigzag shape along the tire circumferential direction are formed on both the sides of the tire equator CL. The main groove 10 has a groove width falling within a range of from 12 mm to 22 mm and a groove depth falling within a range of from 12 mm to 18 mm, for example. Note that, as in the illustrated example, the expression "extending in a zigzag shape" indicates a shape that is repeatedly bent along the tire circumferential direction by alternately repeating a portion extending linearly in a predetermined direction and a portion extending linearly in a direction different from the former portion. In the following description, the bent portion of the main groove 10 is referred to as a bent portion 10A in some cases.

Figure 3:
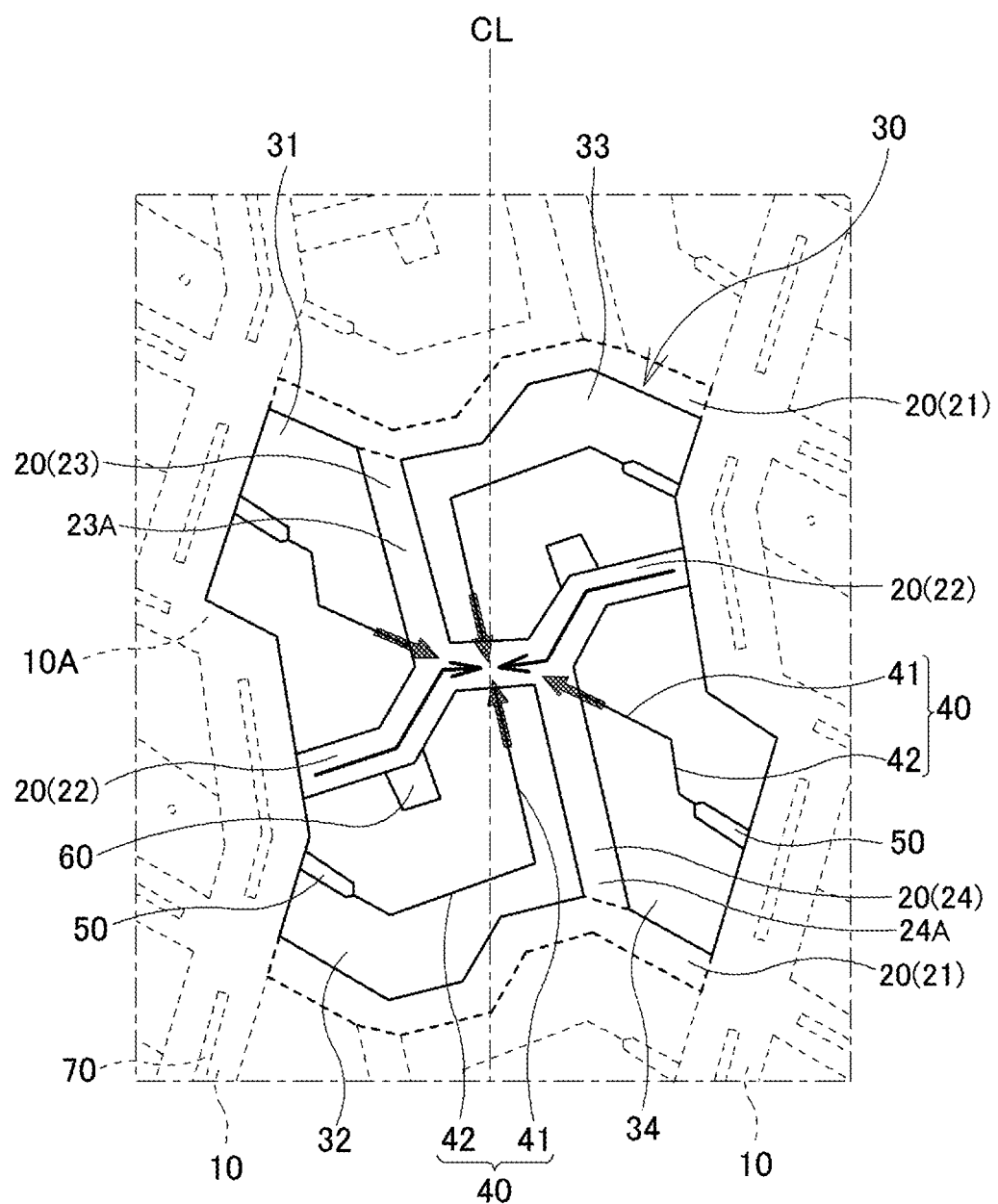
FIG. 3 is an explanatory diagram schematically illustrating an example of a repeating unit of the present technology.

A center land portion 11 is defined between the pair of main grooves 10. As illustrated in FIG. 3 as if extracted, the center land portion 11 is defined as a repeating unit 30 formed of four blocks 31 to 34 that are defined by first to fourth shallow grooves 21 to 24 described later. In other words, an aggregate (repeating unit 30) of the four blocks 31 to 34 defined by the first to fourth shallow grooves 21 to 24 is repeatedly disposed in the tire circumferential direction. In the following description, the first to fourth shallow grooves 21 to 24 are collectively referred to as "shallow groove 20" in some cases. Note that, in the configuration of the entire tread pattern, a pitch length (a length along the circumferential direction) of the repeating unit 30 varies such that a shape in which the blocks 31 to 34 and the shallow grooves 20 that form the repeating unit 30 are shrunk in the circumferential direction is formed in some cases. However, basically, the repeating units disposed in the tire circumferential direction have substantially the same shape.

The plurality of first shallow grooves 21 are disposed at an interval in the tire circumferential direction, each of which is a groove extending along a tire lateral direction and having both ends that communicate with portions other than the bent portion 10A of the main groove 10. The first shallow grooves 21 divide the center land portion 11 in the circumferential direction and define the entire repeating unit 30. Meanwhile, the second to fourth shallow grooves 22 to 24 define the four blocks 31 to 34 included in the repeating unit 30. The second shallow grooves 22 are provided as a pair including one extending in the tire lateral direction from the main groove 10 adjacent to one side of the center land portion 11 to the tire equator CL and the other extending in the tire lateral direction from the main groove 10 adjacent to the other side of the center land portion 11 to the tire equator CL. As indicated with the arrows in FIG. 3, the pair of second shallow grooves 22 are disposed to converge toward one point on the tire equator CL. The third shallow groove 23 is a groove extending from one of the pair of first shallow grooves 21, which is adjacent to the repeating unit 30, to one of the pair of second shallow grooves 22. Further, the fourth shallow groove 24 is a groove extending from the other of the pair of first shallow grooves 21, which is adjacent to the repeating unit 30, to the other of the pair of second shallow grooves 22. Note that the first to fourth shallow grooves 21 to 24 are provided as described above. Thus, basically, a shape in which the four blocks 31 to 34 forming the repeating unit 30 are arranged in two rows in the tire lateral direction and in two rows in the tire circumferential direction is provided within the repeating unit.

Each of the first to fourth shallow grooves 21 to 24 has a groove width falling within a range of, for example, from 4 mm to 12 mm and a groove depth falling within a range of, for example, from 10 mm to 16 mm, which are smaller than the groove width and the groove depth of the main groove 10. All the first to fourth shallow grooves 21 to 24 may have the same groove depth. The third shallow groove 23 and the fourth shallow groove 24 may have a groove depth smaller than the groove depth of the first shallow groove 21 and the second shallow groove 22.

The present technology intends to specify the structure of the center land portion 11 defined between the pair of main grooves 10. Thus, structures of shoulder land portions 12 that are defined outward of the main groove 10 in the tire lateral direction are not particularly limited. In the illustrated example, the shoulder land portion 12 is defined into a plurality of shoulder blocks 12' by a plurality of lug grooves 13 extending in the tire lateral direction. The lug groove 13 has a groove width falling within a range of, for example, from 9 mm to 15 mm and a groove depth falling within a range of, for example, from 12 mm to 18 mm, which are equal to or smaller than the groove width and the groove depth of the main groove 10. When the shoulder land portion 12 is defined into the shoulder blocks 12' as described above, a shape in which two shoulder blocks 12' are arranged for the repeating unit 30 is preferably provided, as in the illustration, by providing lug grooves 13A and lug grooves 13B. The lug groove 13A is positioned on the extension line of the first shallow groove 21, and the lug groove 13B preferably communicates with the bent portion 10A of the main groove 10 at a position not communicating with the intermediate part of the repeating unit 30 in the tire circumferential direction and the second shallow groove 22.

As described above, in the present technology, the center land portion 11 defined between the pair of main grooves 10 extending in a zigzag shape is formed of the repeating units 30 each being the aggregate formed of the four blocks 31 to 34, the first to fourth shallow grooves 21 to 24 are connected as described above, and the second to fourth shallow grooves 22 to 24 included in the repeating unit 30 converge toward the tire equator CL. Thus, a high edge effect can be secured with the complicated shape of the whole shallow grooves, and running performance on unpaved roads can be improved effectively. Further, due to the first to fourth shallow grooves 21 to 24 that are connected as described above, the shape of each of blocks 31 to 34 included in the repeating unit 30 (particularly, the blocks arranged in the tire circumferential direction (the blocks 31 and 32 and the blocks 33 and 34 in the illustrated example)) is not constant. Thus, generation of pattern noise can be suppressed. Further, the first to fourth shallow grooves 21 to 24 are connected as described above, and hence a structure having a large number of branches as a whole is obtained. With this, air column resonance can be suppressed, and transfer of noise can be suppressed. Thus, noise performance can be improved.

In this case, in order to exert an edge effect by the shallow grooves 20 as a whole effectively, the first shallow groove 21 and the second shallow groove 22 are preferably bent. Further, when a large number of the shallow grooves 20 intersect at one point, block rigidity is likely to be degraded. Thus, particularly, the third shallow groove 23 and the fourth shallow groove 24 are preferably joined to the intermediate part of each of the shallow grooves 20 in the longitudinal direction, instead of an end of the first shallow groove 21 or the second shallow groove 22 (an opening end with respect to the main groove 10 or a position at which the pair of second shallow grooves 22 are joined).

A sipe 40 is preferably formed in each of the four blocks 31 to 34 forming the repeating unit 30. Particularly, as in the illustration, each of the sipes 40 preferably includes a straight portion 41 and a bent portion 42. The straight portion 41 extends toward the position at which the pair of second shallow grooves 22 converge and communicates with any one of the second to fourth shallow grooves 22 to 24. The bent portion 42 extends while being bent in the same direction with respect to the straight portion 41. Note that, as illustrated in FIG. 3, the straight portion 41 is not directly opened at the position at which the pair of second shallow grooves 22 converge, and the straight portion 41 is only required to extend toward the position at which the pair of second shallow grooves 22 converge (see the arrows in the illustration). The sipes 40 are provided as described above. With this, an edge effect exerted by the sipes 40 can be added. This is advantageous in improving running performance on unpaved roads. Particularly, each of the sipes 40 includes the straight portion 41 described above, and hence all of the shallow grooves 20 (the second to fourth shallow grooves 22 to 24) and the sipes 40 included in the repeating unit 30 converge toward the tire equator CL. Thus, a further excellent edge effect can be obtained. Further, each of the sipes 40 includes the straight portion 41 and the bent portion 42 described above. With this, not only an excellent edge effect can be obtained, but also increase in a sound pressure level can be suppressed to improve noise performance. Note that, in the present technology, the sipe 40 is a fine groove that has a groove width falling within a range of, for example, from 0.4 mm to 2.0 mm and a groove depth falling within a range of, for example, from 2.5 mm to 15 mm.

Further, a narrow groove 50 is preferably formed in each of the four blocks 31 to 34, one end of the narrow groove 50 preferably communicates with the main groove 10, and the other end is preferably joined to an end of the sipe 40. The narrow grooves 50 are preferably inclined in the same direction with respect to the tire lateral direction and particularly, as in the illustration, are preferably inclined in the same direction as the inclination of the first shallow grooves 21 at the positions communicating with the main grooves 10. In the illustrated example, in each of the sipes 40, the bent portion 42 extends while being bent in the same direction with respect to the straight portion 41, and then the sipe 40 is further bent and joined to the narrow groove 50 inclined in the direction described above. The narrow grooves 50 are provided as described above, and hence dirt discharge performance can be improved more as compared with a case of providing only the sipes 40. This is advantageous in improving running performance on unpaved roads. Note that, in the present technology, the narrow groove 50 is a groove that has a groove width falling within a range of, for example, from 1.5 mm to 5.0 mm and a groove depth falling within a range of, for example, from 3 mm to 10 mm.

The four blocks 31 to 34 forming the repeating unit 30 may be provided with a notch portion 60 opened to any one of the first to fourth shallow grooves 21 to 24, in addition to the sipes 40 and the narrow grooves 50. When the notch portion 60 is provided, the notch portion 60 is preferably provided to at least one of the four blocks 31 to 34. Further, when the shallow groove 20 to which the notch portion 60 is opened is bent, the notch portion 60 is preferably provided to the bent portion of the shallow groove 20. For example, in the illustrated example, of the four blocks 31 to 34, each of the two blocks 32 and 33 that are in a point symmetric relationship with respect to the position at which the pair of second shallow grooves 22 converge is provided with the notch portion 60 opened to the bent portion of the second shallow groove 22. The notch portion 60 is provided as described above, and hence traction performance with respect to road surfaces can be added due to the notch portion 60. This is advantageous in improving running performance on unpaved roads. Further, the shallow groove 20 is further branched due to the notch portion 60, and hence air column resonance is reduced. This is advantageous in improving noise performance. When the notch portion 60 is provided, the sipe 40 formed in the block 32 or 33 provided with the notch portion 60 is preferably bent to surround the notch portion 60 as in the illustrated example.

Figure 4A:
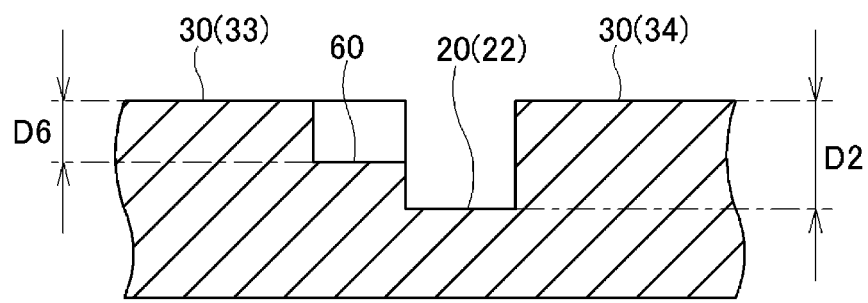
FIG. 4A is a cross-sectional view taken along the X-X line in FIG. 2.
Figure 4B:
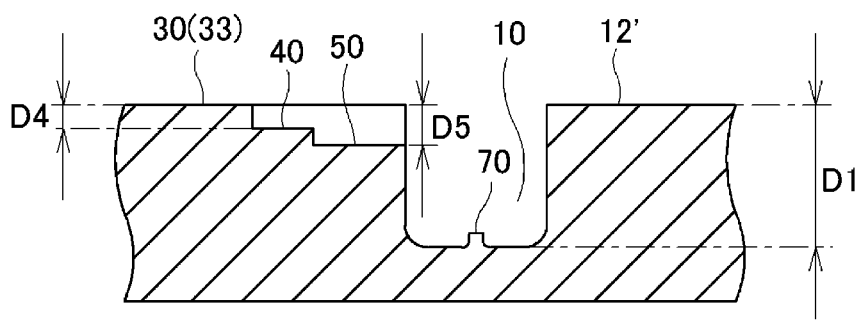
FIG. 4B is a cross-sectional view taken along the Y-Y line in FIG. 2.

In the present technology, the main grooves 10 and the shallow grooves 20 (the first to fourth shallow grooves 21 to 24) are required to be provided, and the sipes 40, the narrow grooves 50, and the notch portion 60 are provided in a freely selected manner. As illustrated in FIG. 4A and FIG. 4B, when the groove depth of the main grooves 10 is indicated with D1, the groove depth of the shallow grooves 20 (the first to fourth shallow grooves 21 to 24) is indicated with D2, the depth of the sipes 40 is indicated with D4, the groove depth of the narrow grooves 50 is indicated with D5, and the depth of the notch portion is indicated with D6, those depths preferably satisfy a relationship of D1>D2>D6>D5. Note that, as the sipe has a sufficiently small groove width and is not regarded as an element for dividing the land portion, the depth D4 is not particularly limited. Preferably, D4 is deeper than D6 and shallower than D2. The depths of the elements are set as described above, and hence an effect of improving running performance on unpaved roads and an effect of reducing noise can be achieved in a well-balanced manner. In this case, when the groove depth D1 of the main grooves 10 being the main groove elements in the tread pattern of the present technology is smaller than the depths D2, D5, and D6 of the shallow grooves 20, the narrow grooves 50, and the notch portion 60, the groove volume of the entire tread portion is reduced. As a result, desired tire performance cannot be obtained. Further, when the groove depth D2 of the shallow grooves 20 that are elements for defining the blocks 31 to 34 and largely contribute to traction characteristics in the center region is smaller than the depths D5 an D6 of the narrow grooves 50 and the notch portion 60 formed in the blocks 31 to 34, running performance on unpaved roads is degraded. Further, when the groove depth D5 of the narrow grooves 50 opened to the main grooves 10 is larger than the depth D6 of the notch portion 60 opened to the shallow groove 20, rigidity of the blocks 31 to 34 in which the narrow groove 50 are formed is degraded remarkably. With this, there may be a risk in that running performance on unpaved roads is affected.

The second to fourth shallow grooves 22 to 24 included in the repeating unit 30 contribute to running performance on unpaved roads as edge components, but may cause degradation of noise performance. Thus, a total groove area of the second to fourth shallow grooves 22 to 24 is preferably suppressed within an appropriate range. Specifically, a ratio of the groove area of the second to fourth shallow grooves 22 to 24 with respect to the area of the entire repeating unit 30 preferably falls within a range of from 17% to 33%. Note that the area of the entire repeating unit 30 indicates a total area of the portion defined by the main grooves 10 and the first shallow grooves 21 and indicates a total of the four blocks 31 to 34 and the groove area of the second to fourth shallow grooves 22 to 24. With this, the ratio of the groove area of the shallow grooves 22 to 24 with respect to the repeating unit 30 can be optimized, and an effect of improving running performance on unpaved roads and an effect of reducing noise can be achieved in a well-balanced manner. When the ratio of the groove area of the second to fourth shallow grooves 22 to 24 with respect to the area of the entire repeating unit 30 is less than 17%, an edge effect exerted by the second to fourth shallow grooves 22 to 24 cannot be ensured sufficiently, and an effect of improving running performance on unpaved roads is limited. When the ratio of the groove area of the second to fourth shallow grooves 22 to 24 with respect to the area of the entire repeating unit 30 exceeds 33%, the groove area is excessively large, and its effect on noise performance becomes a concern.

When a difference among the areas of the road contact surfaces of the four blocks 31 to 34 included in the repeating unit 30 is increased, there may be a risk of generating strange noise caused by the occurrence of a resonance peak or the like. Thus, an area difference among the road contact surfaces of the four blocks 31 to 34 included in the repeating unit 30 is preferably small. Specifically, when the block 31 is freely-selected from the four blocks 31 to 34 included in the repeating unit 30, each of areas S2 to S4 of the road contact surfaces of the other blocks 32 to 34 included in the repeating unit 30 preferably falls within a range of from 70% to 130% of an area S1 of the road contact surface of the block 31. With this, the area difference among the blocks 31 to 34 included in the repeating unit 30 can be suppressed. This is advantageous in improving noise performance. When the area relationship deviates from the above-mentioned range, the area difference among the four blocks 31 to 34 is increased, and its effect on noise performance becomes a concern.

In the present technology, raised bottom portions may be formed on groove bottoms of the first to fourth shallow grooves 21 to 24. For example, in the illustrated example, raised bottom portions 23A and 24A are provided to the third shallow groove 23 and the fourth shallow groove 24, respectively, and a structure in which the third shallow groove 23 and the fourth shallow groove 24 as a whole have raised bottoms is obtained. The raised bottom portions are provided as described above, and hence rigidity of the blocks 31 to 34 included in the repeating unit 30 can be improved. This is advantageous in improving traction performance. Further, a groove cross-sectional area is small at the position at which the raised bottom portion is provided. This is advantageous in improving noise performance. Meanwhile, when the raised bottom portion is provided, the groove volume is reduced, and hence there is risk in that a running performance on unpaved roads is affected. Thus, when the raised bottom portion is provided, the groove depth of the raised bottom portion is preferably 75% or more of the maximum groove depth of the shallow groove 20 to which the raised bottom portion is provided. With this, even at the portion at which the raised bottom portion is formed, the groove depth is ensured appropriately, and hence reduction in the groove volume due to the raised bottom portion can be suppressed. Thus, running performance on unpaved roads can be ensured satisfactorily.

In the present technology, on the groove bottom of the main groove 10, a protrusion portion 70 protruding from the groove bottom of the main groove 10 and extending along the main groove 10 may be provided. When protruding from the groove bottom, the protrusion portion 70 does not occupy the entire width of the corresponding portion of the main groove 10. As in the illustration, the protrusion portion 70 is provided at the center portion of the main groove 10 and is separated away from the groove walls of the main groove 10. The protrusion portion 70 is provided as described above, and hence an edge effect of the protrusion portion 70 can be obtained, and an effect of preventing stone-biting for the main groove 10 can be expected. This is advantageous in improving running performance on unpaved roads. A protrusion height from the groove bottom of the protrusion portion 70 preferably falls within a range of from 1 mm to 3 mm. When the height of the protrusion portion 70 is less than 1 mm, protrusion from the groove bottom is substantially absent, and hence an effect exerted by providing the protrusion portion 70 cannot be obtained. When the height of the protrusion portion 70 exceeds 3 mm, the protrusion portion 70 causes reduction in the groove volume of the main groove 10.

EXAMPLES

Eighteen types of pneumatic tires in Comparative Examples 1 to 3 and Examples 1 to 15 were produced. Each tire had a tire size of LT265/70R17 121Q, had the basic structure illustrated in FIG. 1, and was based on the tread pattern in FIG. 2. For each tire, presence of the first to fourth shallow grooves; presence of convergence of the second shallow grooves; presence of the sipes; presence of the narrow grooves; presence of the notch portion; the relationship among the groove depth D2 of the shallow groove, the groove depth D5 of the narrow groove, and the depth D6 of the notch portion; the ratio of the groove area of the second to fourth shallow grooves with respect to the area of the entire repeating unit; the areas of the road contact surfaces of the four blocks included in the repeating unit (block areas S1 to S4); presence of the raised bottom portion of the first to fourth shallow grooves; the ratio of the groove depth of the raised bottom portion with respect to the maximum groove depth of the shallow groove to which the raised bottom portion was provided; and presence of the protrusion portion of the main groove were set as shown in Tables 1 and 2.

With regard to presence of convergence of the second shallow grooves, a case where the pair of second shallow grooves were converging toward one point on the tire equator was indicated as "Yes", and a case where the pair of second shallow grooves were terminated without reaching the tire equator (were not converging) was indicated as "No". Note that Comparative Example 3 was an example in which the second shallow grooves were terminated at joint positions with the third shallow groove and the fourth shallow groove without converging on the tire equator in the tread pattern in FIG. 2. The area S1 of the road contact surface of the block indicated with reference sign 31 in FIG. 3 among the four blocks included in the repeating unit was set as 100%, and the ratios (%) with respect to the area were shown in the cells regarding the block areas in Tables 1 and 2.

With regard to those pneumatic tires, noise performance and starting performance were evaluated by the following evaluation methods, and the results were also shown in Tables 1 and 2.

Noise Performance

Each test tire was assembled on a wheel having a rim size of 17×8J, inflated to an air pressure of 350 kPa, mounted on a test vehicle (a four wheel drive SUV (sport utility vehicle)), and subjected to a sensory evaluation on pattern noise by a test driver on a circuit course formed of paved road surfaces. Evaluation results are expressed as index values, with the value of Comparative Example 1 expressed as an index value of 100. Larger index values indicate lower pattern noise and superior noise performance. Note that index values of "102" or lower indicate that a difference from Comparative Example 1 being a reference was not substantially observed and that an effect of improving noise performance could not be obtained sufficiently.

Startability

Each test tire was assembled on a wheel having a rim size of 17×8J, inflated to an air pressure of 350 kPa, mounted on a test vehicle (a four wheel drive SUV), and subjected to a sensory evaluation on startability by a test driver on a test course formed of unpaved road surfaces (gravel road surfaces). Evaluation results are expressed as index values, with the value of Comparative Example 1 expressed as an index value of 100. Larger index values indicate superior startability on unpaved roads. Note that index values of "102" indicate that a difference from Comparative Example 1 being a reference was not substantially observed and that an effect of improving starting performance could not be obtained sufficiently.

TABLE 1-1

|  |  | Comparative Example 1 | Comparative Example 2 | Comparative Example 3 |
|---|---|---|---|---|
| Presence of first shallow groove |  | Yes | Yes | Yes |
| Presence of second shallow groove |  | No | Yes | Yes |
| Presence of third shallow groove |  | No | No | Yes |
| Presence of fourth shallow groove |  | No | No | Yes |
| Convergence of second shallow grooves |  | — | Yes | No |
| Presence of sipes |  | No | No | No |
| Presence of narrow groove |  | No | No | No |
| Presence of notch portion |  | No | No | No |
| Relationship of groove depths |  | — | — | — |
| Ratio of groove area | % | — | — | — |
| Block area | S1 % | — | — | — |
|  | S2 % | — | — | — |
|  | S3 % | — | — | — |
|  | S4 % | — | — | — |
| Presence of raised bottom portion |  | No | No | No |
| Groove depth of raised bottom portion | % | — | — | — |
| Presence of protrusion portion |  | No | No | No |
| Noise performance | Index value | 100 | 101 | 102 |
| Startability | Index value | 100 | 101 | 102 |

TABLE 1-2

|  |  | Example 1 | Example 2 | Example 3 |
|---|---|---|---|---|
| Presence of first shallow groove |  | Yes | Yes | Yes |
| Presence of second shallow groove |  | Yes | Yes | Yes |
| Presence of third shallow groove |  | Yes | Yes | Yes |
| Presence of fourth shallow groove |  | Yes | Yes | Yes |
| Convergence of second shallow grooves |  | Yes | Yes | Yes |
| Presence of sipes |  | Yes | No | Yes |
| Presence of narrow groove |  | Yes | No | No |
| Presence of notch portion |  | Yes | Yes | No |
| Relationship of groove depths |  | D2 > D6 > D5 | D2 > D6 | — |
| Ratio of groove area | % | 23 | 23 | 23 |
| Block area | S1 % | 100 | 100 | 100 |
|  | S2 % | 128 | 128 | 128 |
|  | S3 % | 128 | 128 | 128 |
|  | S4 % | 100 | 100 | 100 |
| Presence of raised bottom portion |  | No | No | No |
| Groove depth of raised bottom portion | % | — | — | — |
| Presence of protrusion portion |  | No | No | No |
| Noise performance | Index value | 105 | 103 | 103 |
| Startability | Index value | 107 | 106 | 106 |

TABLE 1-3

|  | Example 4 | Example 5 | Example 6 |
|---|---|---|---|
| Presence of first shallow groove | Yes | Yes | Yes |
| Presence of second shallow groove | Yes | Yes | Yes |
| Presence of third shallow groove | Yes | Yes | Yes |
| Presence of fourth shallow groove | Yes | Yes | Yes |
| Convergence of second shallow grooves | Yes | Yes | Yes |
| Presence of sipes | Yes | Yes | Yes |
| Presence of narrow groove | Yes | Yes | Yes |

TABLE 1-3-continued

|  |  | Example 4 | Example 5 | Example 6 |
|---|---|---|---|---|
| Presence of notch portion |  | No | Yes | Yes |
| Relationship of groove depths |  | D2 > D5 | D6 > D5 > D2 | D2 > D5 > D6 |
| Ratio of groove area | % | 23 | 23 | 23 |
| Block area   S1 | % | 100 | 100 | 100 |
| S2 | % | 128 | 128 | 128 |
| S3 | % | 128 | 128 | 128 |
| S4 | % | 100 | 100 | 100 |
| Presence of raised bottom portion |  | No | No | No |
| Groove depth of raised bottom portion | % | — | — | — |
| Presence of protrusion portion |  | No | No | No |
| Noise performance | Index value | 103 | 103 | 103 |
| Startability | Index value | 106 | 104 | 105 |

TABLE 2-1

|  |  | Example 7 | Example 8 | Example 9 |
|---|---|---|---|---|
| Presence of first shallow groove |  | Yes | Yes | Yes |
| Presence of second shallow groove |  | Yes | Yes | Yes |
| Presence of third shallow groove |  | Yes | Yes | Yes |
| Presence of fourth shallow groove |  | Yes | Yes | Yes |
| Convergence of second shallow grooves |  | Yes | Yes | Yes |
| Presence of sipes |  | Yes | Yes | Yes |
| Presence of narrow groove |  | Yes | Yes | Yes |
| Presence of notch portion |  | Yes | Yes | Yes |
| Relationship of groove depths |  | D2 > D6 > D5 | D2 > D6 > D5 | D2 > D6 > D5 |
| Ratio of groove area | % | 15 | 17 | 33 |
| Block area   S1 | % | 100 | 100 | 100 |
| S2 | % | 128 | 128 | 128 |
| S3 | % | 128 | 128 | 128 |
| S4 | % | 100 | 100 | 100 |
| Presence of raised bottom portion |  | No | No | No |
| Groove depth of raised bottom portion | % | — | — | — |
| Presence of protrusion portion |  | No | No | No |
| Noise performance | Index value | 106 | 105 | 105 |
| Startability | Index value | 105 | 106 | 108 |

TABLE 2-2

|  |  | Example 10 | Example 11 | Example 12 |
|---|---|---|---|---|
| Presence of first shallow groove |  | Yes | Yes | Yes |
| Presence of second shallow groove |  | Yes | Yes | Yes |
| Presence of third shallow groove |  | Yes | Yes | Yes |
| Presence of fourth shallow groove |  | Yes | Yes | Yes |
| Convergence of second shallow grooves |  | Yes | Yes | Yes |
| Presence of sipes |  | Yes | Yes | Yes |
| Presence of narrow groove |  | Yes | Yes | Yes |
| Presence of notch portion |  | Yes | Yes | Yes |
| Relationship of groove depths |  | D2 > D6 > D5 | D2 > D6 > D5 | D2 > D6 > D5 |
| Ratio of groove area | % | 35 | 23 | 23 |
| Block area   S1 | % | 100 | 100 | 100 |
| S2 | % | 128 | 135 | 130 |
| S3 | % | 128 | 135 | 130 |
| S4 | % | 100 | 100 | 100 |
| Presence of raised bottom portion |  | No | No | No |
| Groove depth of raised bottom portion | % | — | — | — |
| Presence of protrusion portion |  | No | No | No |
| Noise performance | Index value | 104 | 103 | 104 |
| Startability | Index value | 109 | 107 | 107 |

TABLE 2-3

|  |  | Example 13 | Example 14 | Example 15 |
|---|---|---|---|---|
| Presence of first shallow groove |  | Yes | Yes | Yes |
| Presence of second shallow groove |  | Yes | Yes | Yes |
| Presence of third shallow groove |  | Yes | Yes | Yes |
| Presence of fourth shallow groove |  | Yes | Yes | Yes |
| Convergence of second shallow grooves |  | Yes | Yes | Yes |
| Presence of sipes |  | Yes | Yes | Yes |
| Presence of narrow groove |  | Yes | Yes | Yes |
| Presence of notch portion |  | Yes | Yes | Yes |
| Relationship of groove depths |  | D2 > D6 > D5 | D2 > D6 > D5 | D2 > D6 > D5 |
| Ratio of groove area | % | 23 | 23 | 23 |
| Block area  S1 | % | 100 | 100 | 100 |
| S2 | % | 128 | 128 | 128 |
| S3 | % | 128 | 128 | 128 |
| S4 | % | 100 | 100 | 100 |
| Presence of raised bottom portion |  | Yes | Yes | Yes |
| Groove depth of raised bottom portion | % | 70 | 75 | 80 |
| Presence of protrusion portion |  | No | No | Yes |
| Noise performance | Index value | 107 | 106 | 107 |
| Startability | Index value | 110 | 111 | 113 |

As can be seen from Tables 1 and 2, any of Examples 1 to 15 improved noise performance and starting performance as compared with Comparative Example 1. Note that only startability on gravel road surfaces was evaluated. However, even in a case of running on other unpaved roads (mud road, rocky areas, snowy roads, and the like), the tire according to the present technology effectively acts on mud, rock, snow, and the like on road surfaces. Thus, excellent starting performance can be exerted on any type of unpaved roads.

Meanwhile, in Comparative Example 2, the third shallow groove and the fourth shallow groove were not formed. In Comparative Example 3, the second shallow grooves were not converging toward one point on the equator. Thus, the shape of the center land portion (repeating unit) was not satisfactory. Thus, an effect of improving noise performance and starting performance could not be obtained sufficiently.

The invention claimed is:

1. A pneumatic tire, comprising:
a tread portion having an annular shape extending in a tire circumferential direction;
a pair of sidewall portions disposed on both sides of the tread portion; and
a pair of bead portions disposed inward of the pair of sidewall portions in a tire radial direction, wherein
the tread portion comprises:
a pair of main grooves extending in a zigzag shape along the tire circumferential direction on both sides of a tire equator; and
a center land portion defined between the pair of main grooves on the tire equator,
the center land portion is defined into a plurality of repeating units by a pair of first shallow grooves that extend along a tire lateral direction, have both ends communicating with portions other than bent portions of the pair of main grooves, and are disposed at an interval in the tire circumferential direction,
each repeating unit is an aggregate formed of four blocks defined by a pair of second shallow grooves extending from the main grooves in the tire lateral direction and converging toward one point on the tire equator, a third shallow groove extending from one of the pair of first shallow grooves, which is adjacent to the repeating unit, to one of the pair of second shallow grooves, and a fourth shallow groove extending from the other of the pair of first shallow grooves, which is adjacent to the repeating unit, to the other of the pair of second shallow grooves,
a sipe is formed in each of the four blocks,
the sipe comprises a straight portion and a bent portion, the straight portion extending toward a position at which the pair of second shallow grooves converge and communicating with any one of the second shallow groove, the third shallow groove or the fourth shallow groove, the bent portion extending while being bent in the same direction with respect to the straight portion,
a narrow groove is formed in each of the four blocks, and
the narrow groove has one end communicating with a main groove and the other end joined to an end of the sipe.

2. The pneumatic tire according to claim 1, wherein at least one of the four blocks includes a notch portion opened to at least one of the first shallow groove, the second shallow groove, the third shallow groove or the fourth shallow groove.

3. The pneumatic tire according to claim 2, wherein a depth of the narrow groove is smaller than a depth of the shallow grooves.

4. The pneumatic tire according to claim 3, wherein a depth of the notch portion is smaller than a depth of the shallow grooves and is larger than a depth of the narrow groove.

5. The pneumatic tire according to claim 4, wherein a groove area ratio of the second to fourth shallow grooves with respect to an area of an entirety of the repeating unit falls within a range of from 17% to 33%.

6. The pneumatic tire according to claim 5, wherein, when a block is freely-selected from the four blocks included in the repeating unit, each of areas of road contact surfaces of other blocks included in the repeating unit falls within a range of from 70% to 130% of an area of a road contact surface of the block.

7. The pneumatic tire according to claim 5, wherein
a raised bottom portion is formed on a groove bottom of each of the first to fourth shallow grooves, and
a groove depth of the raised bottom portion is 75% or more of a maximum groove depth of the shallow grooves to which the raised bottom portion is provided.

8. The pneumatic tire according to claim 7, wherein a protrusion portion is provided on a groove bottom of the main groove, the protrusion portion protruding from the groove bottom of the main groove and extending along the main groove.

9. The pneumatic tire according to claim 1, wherein a depth of the narrow groove is smaller than a depth of the shallow grooves.

10. The pneumatic tire according to claim 1, wherein a depth of a notch portion is smaller than a depth of the shallow grooves and is larger than a depth of the narrow groove.

11. The pneumatic tire according to claim 1, wherein a groove area ratio of the second to fourth shallow grooves with respect to an area of an entirety of the repeating unit falls within a range of from 17% to 33%.

12. The pneumatic tire according to claim 1, wherein, when a block is freely-selected from the four blocks included in the repeating unit, each of areas of road contact surfaces of other blocks included in the repeating unit falls within a range of from 70% to 130% of an area of a road contact surface of the block.

13. The pneumatic tire according to claim 1, wherein a raised bottom portion is formed on a groove bottom of each of the first to fourth shallow grooves, and a groove depth of the raised bottom portion is 75% or more of a maximum groove depth of the shallow groove to which the raised bottom portion is provided.

14. The pneumatic tire according to claim 1, wherein a protrusion portion is provided on a groove bottom of a main groove, the protrusion portion protruding from the groove bottom of the main groove and extending along the main groove.

* * * * *